(12) United States Patent
Ogawa et al.

(10) Patent No.: US 11,164,303 B2
(45) Date of Patent: Nov. 2, 2021

(54) INSPECTION SYSTEM

(71) Applicant: Daifuku Co., Ltd., Osaka (JP)

(72) Inventors: Daisuke Ogawa, Komaki (JP); Tsubasa Yajima, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 16/781,182

(22) Filed: Feb. 4, 2020

(65) Prior Publication Data

US 2020/0286220 A1    Sep. 10, 2020

(30) Foreign Application Priority Data

Mar. 6, 2019  (JP) .............................. JP2019-040290

(51) Int. Cl.
| | |
|---|---|
| *G06T 7/00* | (2017.01) |
| *G01N 21/88* | (2006.01) |
| *G01N 21/95* | (2006.01) |
| *G06T 7/70* | (2017.01) |
| *G06T 7/521* | (2017.01) |

(52) U.S. Cl.
CPC ....... *G06T 7/0004* (2013.01); *G01N 21/8851* (2013.01); *G01N 21/9501* (2013.01); *G06T 7/521* (2017.01); *G06T 7/70* (2017.01); *G06T 2207/30148* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2008/0082213 A1* | 4/2008 | Ban | G06T 7/73 700/260 |
| 2010/0122943 A1* | 5/2010 | Li | B07C 3/00 209/584 |
| 2011/0090333 A1* | 4/2011 | Haugan | G06K 9/2036 348/136 |
| 2014/0036096 A1* | 2/2014 | Sterngren | H04N 17/002 348/188 |
| 2019/0166339 A1* | 5/2019 | De La Cruz | G06T 5/006 |
| 2019/0205662 A1* | 7/2019 | Samal | B60R 1/00 |

FOREIGN PATENT DOCUMENTS

JP           10325866 A     12/1998

* cited by examiner

*Primary Examiner* — Frederick D Bailey
(74) *Attorney, Agent, or Firm* — The Webb Law Firm

(57) ABSTRACT

Provided is an inspection system that can reduce the burden of inspecting a detector provided on a transport vehicle that travels on a preset transport path. An inspection system 1 includes a projection surface 5F that is disposed at a position located within a detection range IE of a detector 3 in a state in which a transport vehicle 2 is present at an inspection location IP set on a transport path R, and onto which detection light IL projected by the detector 3 is projected, an image capturing device C that captures an image of the projection surface 5F, and a determination unit that determines at least one state selected from a position, a shape, and a light intensity of the detection light IL projected onto the projection surface 5F, based on an image captured by the image capturing device C.

7 Claims, 5 Drawing Sheets

INSPECTION SYSTEM

CROSS-REFERENCE TO RELATED APPLICATION

This application claims priority to Japanese Patent Application No. 2019-040290 filed Mar. 6, 2019, the disclosure of which is hereby incorporated by reference in its entirety.

BACKGROUND OF THE INVENTION

1. Field of the Invention

The present invention relates to an inspection system for inspecting a detector provided on a transport vehicle.

2. Description of the Related Art

For example, JP 10-325866A (Patent Document 1) discloses a technique for inspecting an obstacle sensor (6) serving as a detector provided on an unmanned transport vehicle (1). According to the technique disclosed in Patent Document 1, the detection range of the obstacle sensor (6) is inspected by causing the obstacle sensor (6) to detect a simulated obstacle (110) that moves in three dimensions.

However, according to the technique of Patent Document 1, the transport vehicle (1) including the obstacle sensor (6) that is to be inspected is moved by an operator to a location (120) different from a transport path along which the transport vehicle (1) travels to transport an article, and thereafter, the obstacle sensor (6) is inspected. This imposes a burden on the operator to move the transport vehicle (1) when the obstacle sensor (6) is to be inspected, and therefore, there is room for improvement in reducing the burden of performing an inspection.

Therefore, there is demand for an inspection system that can reduce the burden of inspecting a detector provided on a transport vehicle that travels on a preset transport path.

SUMMARY OF THE INVENTION

An inspection system according to the present disclosure is an inspection system for inspecting a detector provided on a transport vehicle that travels on a preset transport path, the inspection system including: a projection surface that is disposed at a position located within a detection range of the detector in a state in which the transport vehicle is present at an inspection location set on the transport path, and onto which detection light projected by the detector is projected; an image capturing device that captures an image of the projection surface; and a determination unit that determines at least one state selected from a position, a shape, and a light intensity of the detection light projected onto the projection surface, based on an image captured by the image capturing device.

With this configuration, the projection surface onto which the detection light projected by the detector provided on the transport vehicle is disposed at a position located within the detection range of the detector in a state in which the transport vehicle is present at an inspection location set on the transport path, and an image capturing device that captures an image of the projection surface is provided. Therefore, it is possible to inspect the detector in a state in which the transport vehicle is present on the transport path. Accordingly, it is possible to reduce the burden of inspecting the detector provided on the transport vehicle that travels along the transport path. With this configuration, it is possible, for example, to determine whether or not the detector is installed in a correct orientation based on the position or the shape of the detection light projected onto the projection surface, or determine whether or not the detector is projecting light normally based on the light intensity, and it is thus possible to appropriately inspect the detector.

Further features and advantages of the technique according to the present disclosure will become apparent from the following description of illustrative and non-limiting embodiments with reference to the drawings.

DETAILED DESCRIPTION OF PREFERRED EMBODIMENTS

An inspection system is for inspecting a detector provided on a transport vehicle that travels on a preset transport path. Such a detector can be used, for example, to enable a transport vehicle to travel safely on the transport path. The inspection system can be used in an article transport facility where a transport vehicle transports an article. In the following, an embodiment of the inspection system will be described taking, a case where the inspection system is applied to an article transport facility as an example.

1. First Embodiment 1-1. Configuration of Article Transport Facility

Figure 1:
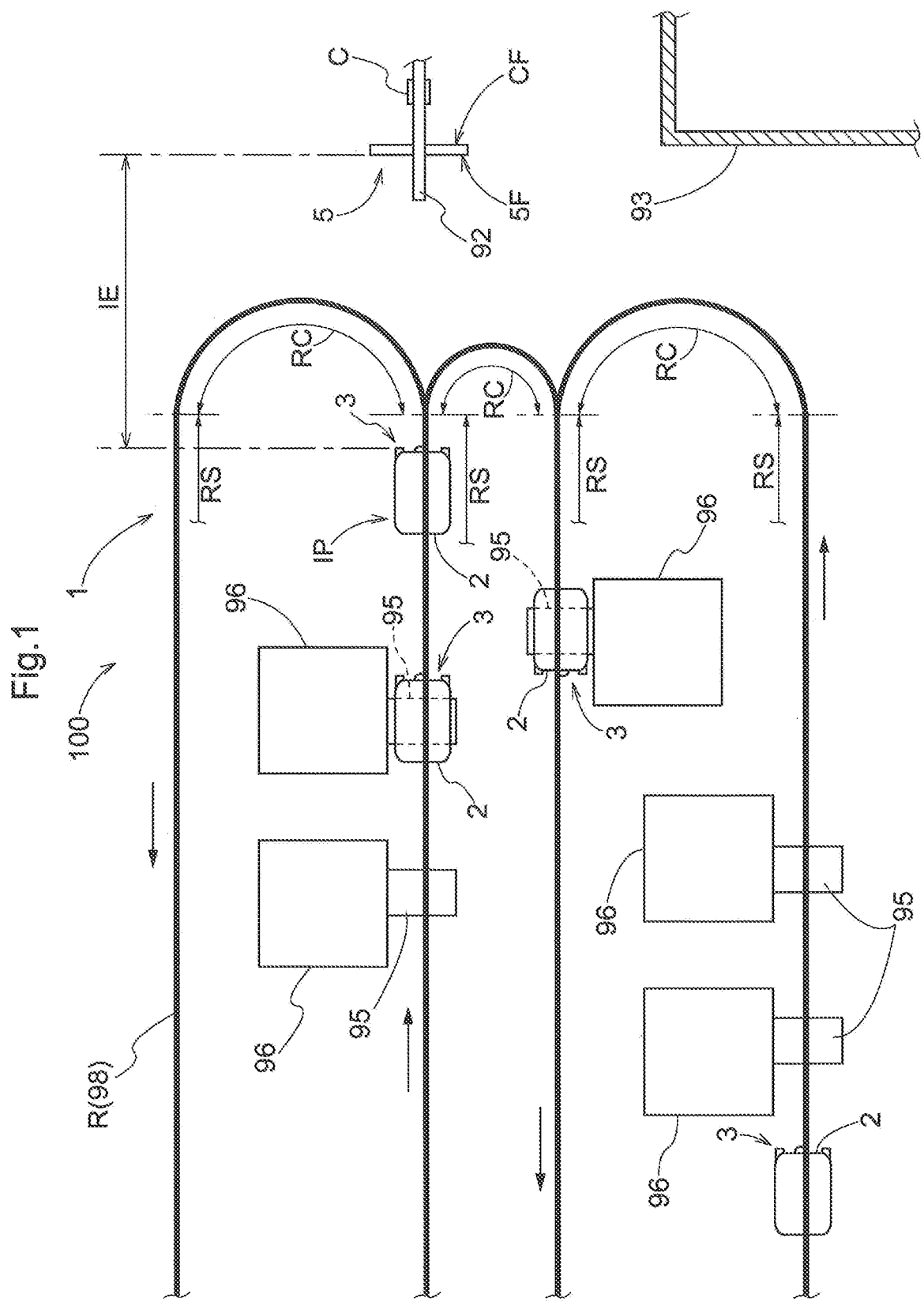
FIG. 1 is a plan view showing an example of the layout of an article transport facility including an inspection system.

As shown in FIG. 1, an article transport facility 100 includes a plurality of transport vehicles 2 that travel along a transport path R. In the present embodiment, the transport path R is set following a travel rail 98 (see FIG. 2, etc.) that is supported by a ceiling. Also, each of the transport vehicles 2 is configured as a ceiling guided vehicle that travels on such a travel rail 98, and transports a material, an intermediate product, and the like in the article transport facility 100 between processes.

Note that, in the following description, for a transport vehicle 2 that travels along the transport path R, a direction running along the advancing direction of the transport vehicles 2 is defined as a "front-rear direction X", and "front" and "rear" are defined with respect to the direction in which the transport vehicle 2 advances. That is, a side toward which the transport vehicle 2 advances along the advancing direction is "front", and the side opposite thereto is "rear". In addition, a direction that is orthogonal to the advancing direction of the transport vehicle 2 in a horizontal plane is defined as a "width direction Y", and a direction that is orthogonal to both the advancing direction and the width direction Y is defined as a "vertical direction Z". Note that, in the present specification, the terms related to the dimensions, arrangement directions, arrangement positions, and the like of members are used as concepts including a state with a difference due to an error (an error that is allowable in manufacturing).

Figure 2:
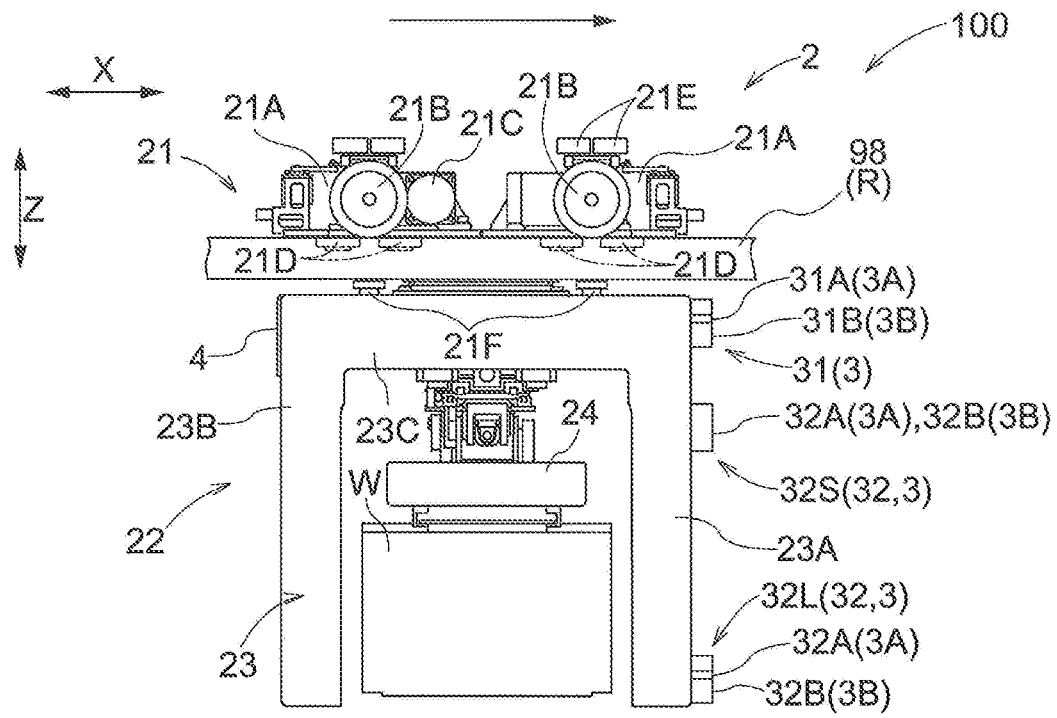
FIG. 2 is a side view of a transport vehicle.
Figure 3:
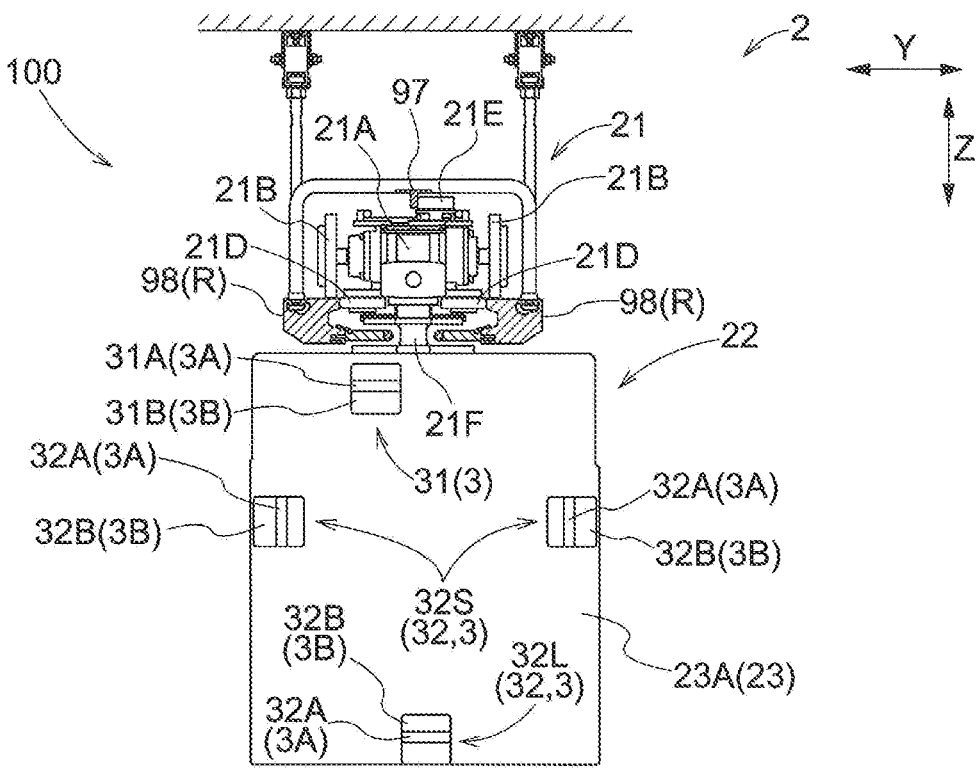
FIG. 3 is a front view of the transport vehicle.

As shown in FIGS. 1 to 3, the article transport facility 100 includes a travel rail 98 that is provided following the transport path R, and a transport vehicle 2 that travels along the travel rail 98 (the transport path R) so as to transport an article W. A pair of left and right travel rails 98 are provided, and are supported from the ceiling so as to be suspended.

As shown in FIG. 1, the transport path R includes a straight segment RS that is formed in a straight-line shape, and a curve segment RC that is formed in a curved shape. For example, the article transport facility 100 includes a plurality of bays (processes). The transport path R includes an intra-bay path provided for each bay, and an inter-bay path that connects the plurality of intra-bay paths to each other. Each of the inter-bay paths and the intra-bay paths are formed by combining a plurality of straight segments RS and a plurality of curve segments RC.

The article transport facility 100 includes a processing device 96 and a platform 95. The processing device 96 may be a semiconductor processing device or the like that performs processing or the like of a semiconductor substrate, for example. A platform 95 is provided at a position that is adjacent to the corresponding one of a plurality of processing devices 96, and that overlaps the travel rail 98 in a plan view. Note that, depending on the configuration of the transport vehicle 2, the platform 95 may be provided at a position that does not overlap the travel rail 98 in a plan view.

The article transport facility 100 is installed inside a building. The building is surrounded by a partition wall 93 on four sides thereof (FIG. 1 only shows a portion of the partition wall 93). Note that the article transport facility 100 may be provided with partitions for dividing the interior of the facility into a plurality of regions, an automatic warehouse for temporarily storing workpieces between processes, and so forth.

Each transport vehicle 2 transports an article W between different platforms 95, or, when an automatic warehouse is provided, between the automatic warehouse and the platforms 95. As described above, when the article transport facility 100 is a semiconductor manufacturing facility (when each processing device 96 is a semiconductor processing device), the article W may be a container (Front Opening Unified Pod; FOUP) or the like that houses a semiconductor substrate, for example.

As shown in FIGS. 2 and 3, the transport vehicle 2 includes a travel portion 21 and a transport main body portion 22. The travel portion 21 includes a vehicle main body 21A and a plurality of wheels 21B that are rotatably supported on the vehicle main body 21A. A pair of front and rear vehicle main bodies 21A are provided. A pair of left and right wheels 21B are provided on each of the pair of front and rear vehicle main bodies 21A, and roll on the upper surface of the travel rails 98. At least one of the plurality of wheels 21B (four wheels in the present example) is a driving wheel that is driven to rotate by a drive motor 21C, and applies a driving force to the transport vehicle 2.

The travel portion 21 includes lower guide rollers 21D and upper guide rollers 21E. Each lower guide roller 21D is supported below the vehicle main body 21A so as to be rotatable about a vertical axis relative to the vehicle main body 21A. Each lower guide roller 21D rolls in contact with a side surface of the travel rail 98. The upper guide rollers 21E are supported above the vehicle main body 21A so as to be rotatable about the vertical axis relative to a switching mechanism that is provided on the vehicle main body 21A. The switching mechanism is configured to switch the position of the upper guide rollers 21E laterally (in the width direction Y). The upper guide rollers 21E roll in contact with one of the left and right sides of a guide rail 97 at a branch point of the transport path R according to the state of the switching mechanism.

A coupling shaft 21F is coupled to each of the pair of front and rear vehicle main bodies 21A, and the transport main body portion 22 is supported, via the coupling shafts 21F, by the travel portion 21 so as to be suspended. The transport main body portion 22 includes a case 23 and a holding portion 24. In the example shown in FIG. 2, the holding portion 24 is housed inside the case 23.

The case 23 includes a front case portion 23A that covers the front side in the advancing direction relative to the holding portion 24, a rear case portion 23B that covers the rear side in the advancing direction relative to the holding portion 24, and an upper case portion 23C that covers the top of the holding portion 24 and couples the front case portion 23A and the rear case portion 23B. The front case portion 23A extends downward from a front-side end of the upper case portion 23C, and the rear case portion 23B extends downward from a rear-side end of the upper case portion 23C. The case 23 is open at the bottom and on both lateral sides, and is formed in an angular U-shape as viewed in the width direction Y.

The holding portion 24 holds an article W by gripping the article W. The holding portion 24 is configured to raise and lower the article W in a state in which the article W is held thereby. The holding portion 24 is housed inside the case 23 at a raised position, and the transport vehicle 2 travels along the transport path R in that state. In a state in which the transport vehicle 2 is at a transfer location (e.g., a position above the platform 95 or a position above a transfer portion of the automatic warehouse), the holding portion 24 moves down to a lowered position, at which the holding portion 24 loads/unloads the article W.

As described above, the transport vehicle 2 includes a detector 3. A detection range IE is set for the detector 3. The detector 3 is configured to detect an object within the detection range IE. In the present embodiment, the detector 3 is provided on a front portion of the transport vehicle 2. In the illustrated example, the detector 3 is provided on the front case portion 23A of the case 23. The above-described detection range IE is set to a predetermined distance (e.g., several meters to several tens of meters) range toward the front of the transport vehicle 2.

The detector 3 is configured as an optical sensor. In the present embodiment, the detector 3 includes a light projecting portion 3A that projects detection light IL, and a light receiving portion 3B that receives light.

In the present embodiment, the transport vehicle 2 includes, as the detector 3, a first detector 31 and a second detector 32 that detects a detection object different from what is detected by the first detector 31. The first detector 31 projects first detection light IL1 as the detection light IL, and the second detector 32 projects second detection light IL2 (see FIG. 4). In the illustrated example, both the first detector 31 and the second detector 32 are provided on the front case portion 23A of the case 23.

In the present example, the first detector 31 is a front vehicle sensor for detecting another transport vehicle 2 in front of the transport vehicle 2 including the first detector 31. Also, the first detector 31 includes a first light projecting portion 31A that projects the first detection light IL1, and a first light receiving portion 31B that receives reflected light of the first detection light IL1. In the illustrated example, one first detector 31 is provided at an upper portion of the front case portion 23A. Also, as shown in FIG. 3, the first detector 31 is provided at one location at a central portion of the transport vehicle 2 in the width direction Y. The first detector 31 is configured to project the first detection light IL1 forward using the first light projecting portion 31A. In the present embodiment, a first irradiation range 31E (see FIG. 6), which is an irradiation range E of the first detector 31, is a linear or band-shaped range extending along the width direction Y. The first detector 31 projects the first detection light IL1 toward a reflection plate 4 provided on the rear case portion 23B of the transport vehicle 2 in front thereof, using the first light projecting portion 31A and receives reflected light from the reflection plate 4 using the first light receiving portion 31B. Thus, the first detector 31 detects the transport vehicle 2 in front thereof.

Figure 6:
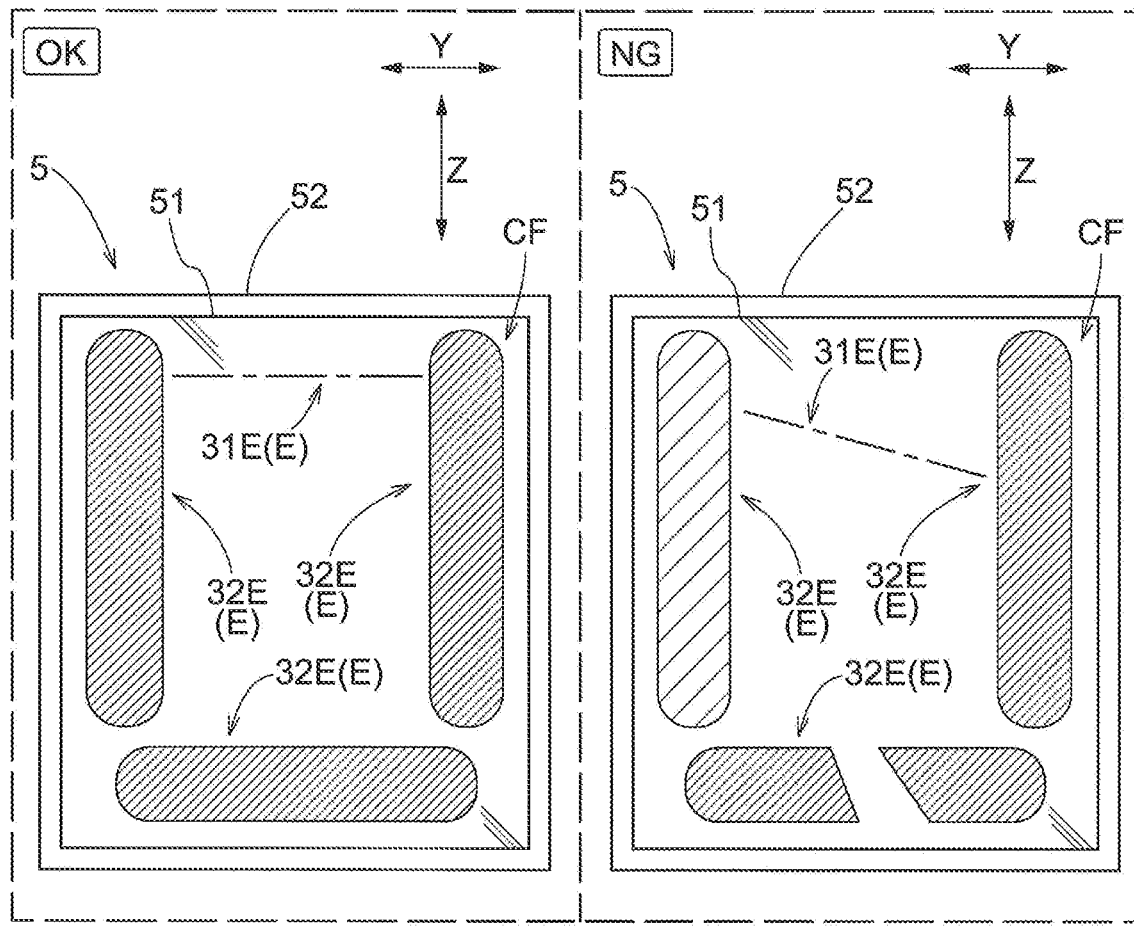
FIG. 6 shows diagrams showing the image-capturing surface side of the projection portion in a state in which detection light is projected.

In the present example, the second detector 32 is an obstacle sensor for detecting an obstacle on the travel trajectory of the transport vehicle 2. Also, the second detector 32 includes a second light projecting portion 32A that projects second detection light IL2, and a second light receiving portion 32B that receives reflected light of the second detection light IL2. The second detector 32 is configured to project the second detection light IL2 forward using the second light projecting portion 32A. In the illustrated example, the second detector 32 is provided at a position lower than the position of the front case portion 23A at which the first detector 31 is provided. In addition, as shown in FIG. 3, the second detector 32 includes lateral side detection portions 32S provided at two locations on both sides of the transport vehicle 2 in the width direction Y, and a lower side detection portion 32L provided at one location that is below the lateral side detection portions 32S and at a central portion in the width direction Y. In the present embodiment, a second irradiation range 32E (see FIG. 6), which is an irradiation range E of the second detector 32, is set to a plurality of (three in the present example) ranges. More specifically, as shown in FIG. 6, two of the plurality of second irradiation ranges 32E are the irradiation ranges E of the second detection light IL2 that is projected from the two lateral side detection portion 32S, and have an oval shape (or a band shape) extending along the vertical direction Z. Also, one of the plurality of second irradiation ranges 32E is the irradiation range E of the second detection light IL2 that is projected from the lower side detection portion 32L, and has an oval shape (or a band shape) extending along the width direction Y.

Thus, using the first detector 31 provided on a transport vehicle 2, the article transport facility 100 can detect another transport vehicle 2 in front thereof. Then, when the inter-vehicle distance with the other transport vehicle 2 in front is too short, it is possible to prevent the transport vehicle 2 from colliding with the other transport vehicle 2 in front from behind, for example, by reducing the traveling speed of the transport vehicle 2 or stopping the transport vehicle 2. In addition, the article transport facility 100 can detect an obstacle on the travel trajectory of the transport vehicle 2 using the second detector 32 provided on the transport vehicle 2. Then, when an obstacle is detected, it is possible to prevent the transport vehicle 2 from coming into contact with the obstacle by stopping the transport vehicle 2, for example.

1-2. Configuration of Inspection System

Here, when the state (detection state) of the detector 3 is abnormal, it may not be possible to favorably detect a detection object. For example, when a transport vehicle 2 in front cannot be detected because of an abnormal detection state of the first detector 31 configured as the front vehicle sensor, the transport vehicle 2 including such a first detector 31 may collide with a transport vehicle 2 in front thereof. When an obstacle is present on the travel trajectory of a transport vehicle 2, but the obstacle cannot be detected because of an abnormal detection state of the second detector 32 configured as the obstacle sensor, the transport vehicle 2 including such a second detector 32 may come into contact with the obstacle. Therefore, it is desirable to periodically inspect the state of the detector 3.

Figure 4:
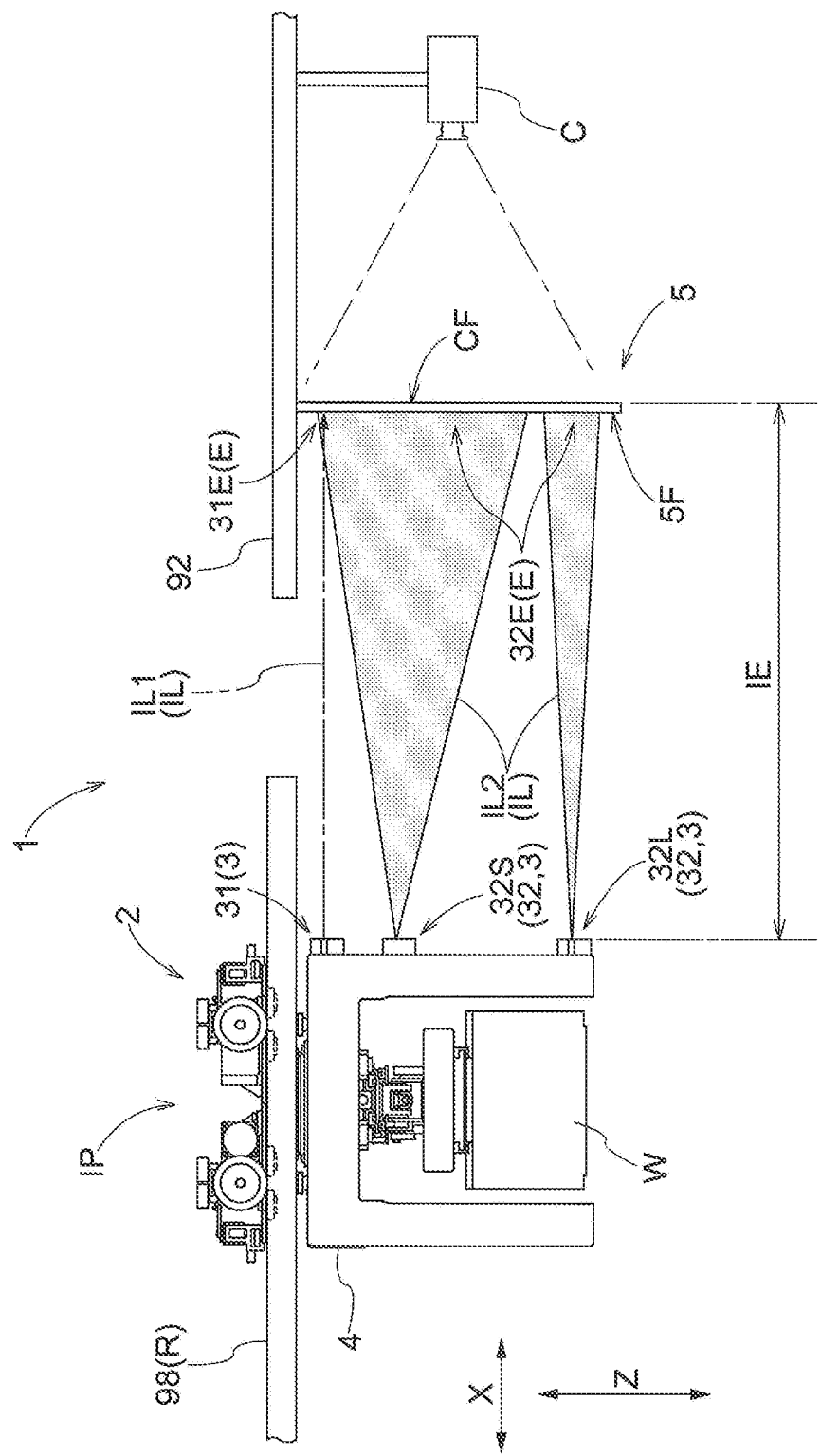
FIG. 4 is an explanatory diagram showing a state in which a detector is inspected by the inspection system.

As shown in FIGS. 1 and 4, the inspection system 1 includes a projection surface 5F onto which the detection light IL projected by the detector 3 is projected, an image capturing device C that captures an image of the projection surface 5F, and a determination unit J (see FIG. 7) that determines at least one state selected from the position, shape, and light intensity of the detection light IL projected onto the projection surface 5F, based on an image captured by the image capturing device C. Here, the determination unit J determines whether the detection state of the detector 3 is normal or abnormal. For example, the determination unit J determines displacement of the optical axis of the detection light IL, or in other words, whether or not the detector 3 is installed in a correct orientation, based on the position (or shape) of the detection light IL projected onto the projection surface 5F. In addition, the determination unit J determines whether or not the detector 3 is projecting light normally, based on the light intensity (or shape) of the detection light IL projected onto the projection surface 5F. If it is determined that the state (detection state) of the detector 3 is abnormal, for example, when the orientation of the detector 3 is incorrect or the detector 3 is not projecting light normally, the detector 3 is determined to be subjected to maintenance, and the necessary maintenance is performed.

Here, the light intensity of the detection light IL may be reduced, for example, due to degradation of the detector 3 over time. In this case, a detection object may not be appropriately detected even if the orientation of the detector 3 is correct. In the present embodiment, "light intensity" of the detection light IL that is subjected to determination performed by the determination unit J is defined with respect to at least one of a light amount, a total luminous flux (lumen), an illuminance (lux), a luminous intensity (candela), and a brightness (luminous intensity per unit area). For example, the determination unit J determines that the state of the detector 3 is abnormal, if the light intensity of the detection light IL projected onto the projection surface 5F is less than a predetermined specified value (if the light intensity is insufficient).

As shown in FIGS. 1 and 4, the projection surface 5F is disposed at a position located within the detection range IE of the detector 3 in a state in which the transport vehicle 2 is present at an inspection location IP that is set on the transport path R. Accordingly, the detector 3 can be inspected in a state in which the transport vehicle 2 is present on the transport path R. In addition, in the present embodiment, the projection surface 5F is disposed at a position that does not overlap the travel trajectory of the transport vehicle 2. This makes it possible to inspect the detector 3, while preventing the transport vehicle 2 that travels along the transport path R and the projection surface 5F from coming into contact with each other.

In the present embodiment, the inspection system 1 includes the projection portion 5, and the projection surface 5F is formed as a part of the projection portion 5. In the present example, as shown in FIG. 1, the projection portion 5 is supported by a supporting member 92 disposed at a position that does not overlap the travel trajectory of the transport vehicle 2. For example, the supporting member 92 is fixed to a structure, such as the ceiling, in the facility, and the projection portion 5 is supported (here, supported so as to be suspended) by the supporting member 92. Thus, in the present example, the projection portion 5 is disposed in a fixed state in the facility. Note that the projection portion 5 is not limited to such a configuration, and may be supported not by the supporting member 92, but by, for example, a partition wall 93 (see FIG. 1), or an outer wall portion, a partition or the like (not shown) of the automatic warehouse.

In the present embodiment, the projection surface 5F is configured to allow a portion of light to pass therethrough. In the example shown in FIG. 5, the projection portion 5 includes a projection plate 51 on which the projection surface 5F is formed, and a support frame 52 that supports the projection plate 51. Also, the projection plate 51 is formed of an acrylic plate, for example, and the projection surface 5F that is formed on the projection plate 51 allows a portion of light to pass therethrough. The support frame 52 is disposed so as to cover the entire periphery of an outer edge of the projection plate 51, and supports the projection plate 51.

Figure 5:
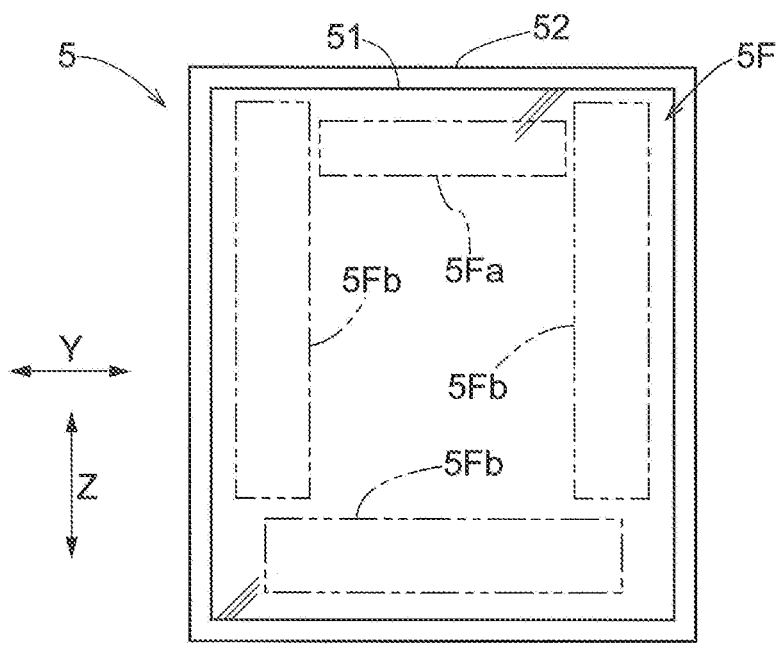
FIG. 5 is an explanatory diagram showing the projection surface side of a projection portion.

As shown in FIG. 5, in the present embodiment, the projection surface 5F includes a first projection region 5Fa onto which the first detection light IL1 is projected, and a second projection region 5Fb onto which the second detection light IL2 is projected. The first projection region 5Fa is formed at a position corresponding to the first detector 31 in a state in which the transport vehicle 2 is present at the inspection location IP (see FIG. 3 also). In the example shown in FIG. 5, the first projection region 5Fa is formed on an upper portion of the projection surface 5F, at one location at a central part in the width direction Y. The second projection region 5Fb is formed at a position corresponding to the second detector 32 in a state in which the transport vehicle 2 is present at the inspection location IP (see FIG. 3 also). In the example shown in FIG. 5, the second projection region 5Fb is formed on the projection surface 5F, at three locations at a lower portion and both edges in the width direction Y.

In the present embodiment, the determination unit J (see FIG. 7) determines, based on an image captured by the image capturing device C, at least one state selected from the position, shape, and light intensity of the first detection light IL1 projected onto the first projection region 5Fa, and at least one state selected from the position, shape, and light intensity of the second detection light IL2 projected onto the second projection region 5Fb.

Here, "determine the position of the first detection light IL1 projected onto the first projection region 5Fa" is a concept also including determining whether the first detection light IL1 is projected either inside or outside a specified first projection region 5Fa. The first detection light IL1 being projected inside the first projection region 5Fa can be a basis for determining that the first detector 31 is in a normal state in which it is installed in a correct orientation. Conversely, the first detection light IL1 being projected outside the first projection region 5Fa can be a basis for determining that the state (detection state) of the first detector 31 is abnormal. Similarly, "determine the position of the second detection light IL2 projected onto the second projection region 5Fb" is a concept also including determining whether the second detection light IL2 is projected either inside or outside a specified second projection region 5Fb. The state (detection state) of the second detector 32 can be determined in the same manner as in the case of the first detector 31 described above.

The image capturing device C is formed by a camera that captures an image of the projection surface 5F of the projection portion 5. The image capturing device C captures a still image or a moving image relating to the projection surface 5F.

As shown in FIGS. 1 and 4, in the present embodiment, the image capturing device C is disposed on a side opposite to the inspection location IP across the projection surface 5F. Accordingly, in the present example, the image capturing device C captures an image of the projection surface 5F from the side opposite to the inspection location IP across the projection surface 5F. Therefore, the image capturing device C captures an image of the back surface (capturing surface CF) of the projection surface 5F. Thus, in the present embodiment, a surface of the projection plate 51 that faces the inspection location IP serves as the projection surface 5F onto which the detection light IL is projected, and a surface of the projection plate 51 that faces the side opposite to the projection surface 5F serves as the capturing surface CF. The image capturing device C is configured to capture an image of the projection surface 5F from the back by capturing an image of the capturing surface CF of the projection plate 51. Note that, in the illustrated example, the image capturing device C is supported (here, supported so as to be suspended) together with the projection portion 5 by the supporting member 92 by which the projection portion 5 is supported. With a configuration in which the image capturing device C and the projection portion 5 are supported by the same member, the arrangement relationship between the image capturing device C and the projection portion 5 (projection surface 5F) can be easily fixed. However, the present disclosure is not limited to this configuration, and the image capturing device C and the projection portion 5 may be separately supported by different members.

As shown in FIGS. 1 and 4, in the present embodiment, the transport vehicle 2, the projection surface 5F (the projection portion 5), and the image capturing device C are disposed so as to be aligned along the front-rear direction X of the transport vehicle 2 in a state in which the transport vehicle 2 is present at the inspection location IP. Accordingly, when the projection surface 5F is configured to allow a portion of light to pass therethrough, an image of the detection light IL that is projected onto the projection surface 5F can be captured in a less distorted state by the image capturing device C from the back surface side (the capturing surface CF side) of the projection surface 5F. As a result, it is possible to obtain an image suitable for determination performed by the determination unit J. In particular, it is preferable that the transport vehicle 2, the projection surface 5F (the projection portion 5), and the image capturing device C are disposed so as to overlap in a front-rear-direction-X view along the front-rear direction X. However, the present disclosure is not limited to the above-described configuration, and the projection surface 5F and the image capturing device C may be arranged in a relationship in which they are disposed so as not to overlap each other as viewed in the front-rear direction X of the transport vehicle 2. In other words, the image capturing device C may be disposed so as to capture an image of the projection surface 5F from a direction that is inclined in at least one of the width direction Y and the vertical direction Z relative to a direction orthogonal to the projection surface 5F (here, the front-rear direction X). In this case as well, the image capturing device C is disposed at a position at which an image of the projection surface 5F can be captured (a position at which the projection surface 5F can be captured from the back surface side in the present example). In the inspection system 1, the state of the detector 3 is determined based not on the detection light IL itself that is projected by the detector 3, but on the detection light IL that is projected onto the projection surface 5F. Accordingly, as long as the image capturing device C is disposed at a position at which an image of the projection surface 5F can be captured, the state (detection state) of the detector 3 can be appropriately determined by the inspection system 1, even if the image capturing device C is disposed at a position displaced as viewed in the front-rear direction X relative to the projection surface 5F as described above.

1-3. Determination of State of Detector

Next, the determination of the state (detection state) of the detector 3 will be described with reference to FIG. 6. FIG. 6 schematically shows images of the capturing surface CF side of the projection portion 5, captured by the image capturing device C. In other words, FIG. 6 shows images of the projection surface 5F onto which the detection light IL is projected, captured from the back surface side. The left diagram in FIG. 6 shows a case where the state of the detector 3 is normal (OK), and the right diagram in FIG. 6 shows a case where the state of the detector 3 is abnormal (ABNORMAL).

The determination unit J determines whether the state of the detector 3 is normal or abnormal by determining the position of the detection light IL projected onto the projection surface 5F. In the state shown in the left diagram in FIG. 6, the first irradiation range 31E resulting from the first detection light IL1 is projected at a position corresponding to the first projection region 5Fa (see FIG. 5), and each of the second irradiation ranges 32E resulting from the second detection light IL2 is projected at a position corresponding to the second projection region 5Fb (see FIG. 5). When the irradiation range of the detection light IL falls within a specified range in this manner, it is determined, by the determination unit J, that the position of the detection light IL projected onto the projection surface 5F is normal (OK). On the other hand, in the state shown in the right diagram in FIG. 6, the first irradiation range 31E is projected at a position that is displaced downward from the position corresponding to the first projection region 5Fa. In this case, it is determined, by the determination unit J, that the position of the detection light IL projected onto the projection surface 5F is abnormal (ABNORMAL).

The determination unit J determines whether the state of the detector 3 is normal or abnormal by determining the shape of the detection light IL projected onto the projection surface 5F. In the state shown in the left diagram in FIG. 6, the shape of the first irradiation range 31E resulting from the first detection light IL1 is a straight-line shape extending along the horizontal direction, and the shape of each of the second irradiation ranges 32E resulting from the second detection light IL2 is a specified shape, namely, a band shape in the present example (a band shape with both ends forming an arch shape in the illustrated example). In this case, it is determined, by the determination unit J, that the shape of the detection light IL projected onto the projection surface 5F is normal (OK). Here, the specified shape can be specified, for example, according to a condition such as the width or the length of the irradiation range in which the detection light IL is irradiated. On the other hand, in the state shown in the right diagram in FIG. 6, the shape of the first irradiation range 31E is a straight-line shape that is obliquely inclined relative to the horizontal direction. In addition, the shape of the second irradiation range 32E projected at a lower portion of the capturing surface CF (the projection surface 5F) is a shape that is divided into two short bands. In these cases, it is determined, by the determination unit J, that the shape of the detection light IL projected onto the projection surface 5F is abnormal (ABNORMAL).

The determination unit J determines whether the state of the detector 3 is normal or abnormal by determining the light intensity of the detection light IL projected onto the projection surface 5F. In the state shown in the left diagram in FIG. 6, the light intensity of the first detection light IL1 that forms the first irradiation range 31E and the light intensity of the second detection light IL2 that forms the second irradiation range 32E are greater than or equal to a specified value. In this case, it is determined, by the determination unit J, that the light intensity of the detection light IL projected onto the projection surface 5F is normal (OK). Here, the condition for determining that the light intensity is greater than or equal to the specified value can be set as a combination of a position within the irradiation range and the light intensity at that position. For example, it is possible to set a condition that the light intensity is determined as being normal if the light intensity at a portion within the irradiation range at which the light intensity is the highest is greater than or equal to the specified value, or a condition that the light intensity is determined as being normal if the light intensity at a portion at which the light intensity is the lowest, excluding the outer edge of the irradiation range, is greater than or equal to the specified value. On the other hand, in the state shown in the right diagram in FIG. 6, the light intensity of the second detection light IL2 that forms the second irradiation range 32E on the left side of the capturing surface CF, among the plurality of second irradiation ranges 32E, is less than the specified value. In this case, it is determined, by the determination unit J, that the light intensity of the detection light IL projected onto the projection surface 5F is low, i.e., abnormal (ABNORMAL).

1-4. Control Configuration of Inspection System

Figure 7:
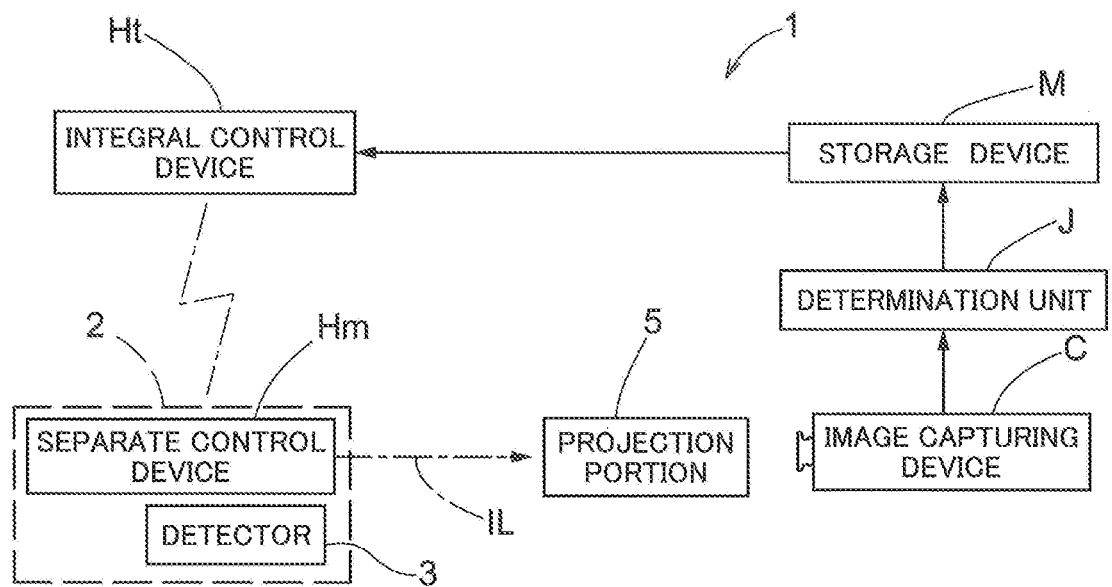
FIG. 7 is a block diagram showing a control configuration of the inspection system.

Next, the control configuration of the inspection system 1 will be described with reference to FIG. 7. As shown in FIG. 7, the inspection system 1 includes an integral control device Ht that manages the entire system, a separate control device Hm that controls the transport vehicle 2, and a storage device M that stores a result of determination performed by the determination unit J. The integral control device Ht and the separate control device Hm are configured to be capable of communicating with each other. These control devices each include, for example, a processor such as a microcomputer and a peripheral circuit such as a memory. Various functions are implemented by these pieces of hardware working cooperatively with a program executed on a processor such as a computer.

In the present embodiment, a separate control device Hm is included in each of the plurality of transport vehicles 2, and performs control of the corresponding one of the plurality of transport vehicles 2. For example, the separate control device Hm controls the traveling and the stopping of the corresponding transport vehicle 2, and transfer of the article W or the like performed by the transport vehicle 2.

In the present embodiment, the integral control device Ht performs overall control of the article transport facility 100 including the plurality of transport vehicles 2. Also, the integral control device Ht gives various instructions such as a transport instruction to the separate control device Hm (the transport vehicle 2). In the present example, the integral control device Ht gives an inspection instruction for inspecting the detector 3 to the separate control device Hm (the transport vehicle 2). The inspection instruction from the integral control device Ht includes an instruction to cause the transport vehicle 2 to travel to the inspection location IP, and an instruction to cause the transport vehicle 2 to perform an operation for inspection at the inspection location IP. The separate control device Hm that has received the inspection instruction from the integral control device Ht causes the own vehicle (transport vehicle 2) to travel to the inspection location IP. Then, in the present example, the separate control device Hm inspects the detector 3 in a state in which the own vehicle (transport vehicle 2) is stopped at the inspection location IP. However, the present disclosure is not limited to such a configuration, and the inspection system 1 may inspect the detector 3 in a state in which the transport vehicle 2 is traveling in front of or rearward of the inspection location IP (preferably in a low-speed traveling state).

In the present example, first, the detector 3 projects the detection light IL toward the projection surface 5F of the projection portion 5 in a state in which the transport vehicle 2 is stopped at the inspection location IP. Note that projection of the detection light IL by the detector 3 may be performed constantly, or may be performed after the transport vehicle 2 has stopped at the inspection location IP. While the detection light IL is being projected by the detector 3, the image capturing device C captures an image of the projection surface 5F (the capturing surface CF, which is the back surface side of the projection surface 5F, in the present example). Next, the determination unit J determines the state (detection state) of the detector 3 based on an image captured by the image capturing device C, and transmits a determination result to the storage device M. The storage device M stores the received determination result for the state of the detector 3. For example, an inspection date and time, which is the date and time when determination by the determination unit J has been performed, and a result of determination by the determination unit J are stored in association with each other in the storage device M. The integral control device Ht is configured to be capable of communicating with the storage device M, and be capable of acquiring the above-described determination result stored in the storage device M. The integral control device Ht manages identification information for identifying the transport vehicle 2 to which the inspection instruction has been given, a determination result relating to the detector 3 mounted to that transport vehicle 2, and an inspection date and time when determination by the determination unit J has been performed, in association with each other.

FIG. 7 shows an example in which the integral control device Ht and the storage device M are separately provided. However, the present disclosure is not limited to such a configuration, and it is possible to adopt a configuration in which the integral control device Ht includes the storage device M. In this case, the determination result is transmitted from the determination unit J to the integral control device Ht.

FIG. 7 also shows an example in which the integral control device Ht and the determination unit J are separately provided. However, the present disclosure is not limited to such a configuration, and it is possible to adopt a configuration in which the integral control device Ht includes the determination unit J. In this case, information regarding an image captured by the image capturing device C is transmitted from the image capturing device C to the integral control device Ht.

If it is determined that the state (detection state) of the detector 3 is normal as the result of inspecting the detector 3 at the inspection location IP, it is preferable that the integral control device Ht resumes a normal operation in which a transport instruction or the like is given to the separate control device Hm (the transport vehicle 2). On the other hand, if it is determined that the state (detection state) of the detector 3 is abnormal, it is preferable that the integral control device Ht moves the transport vehicle 2 toward a withdrawal location for transport vehicles 2 that do not perform transfer or the like of an article W. However, the present disclosure is not limited to such a configuration, and the separate control device Hm (transport vehicle 2) may resume a normal operation in a limited manner, for example, until transport of the article W being transported ends, even if it is determined that the state (detection state) of the detector 3 is abnormal.

2. Other Embodiments

Next, other embodiments of the inspection system will be described.

Figure 8:
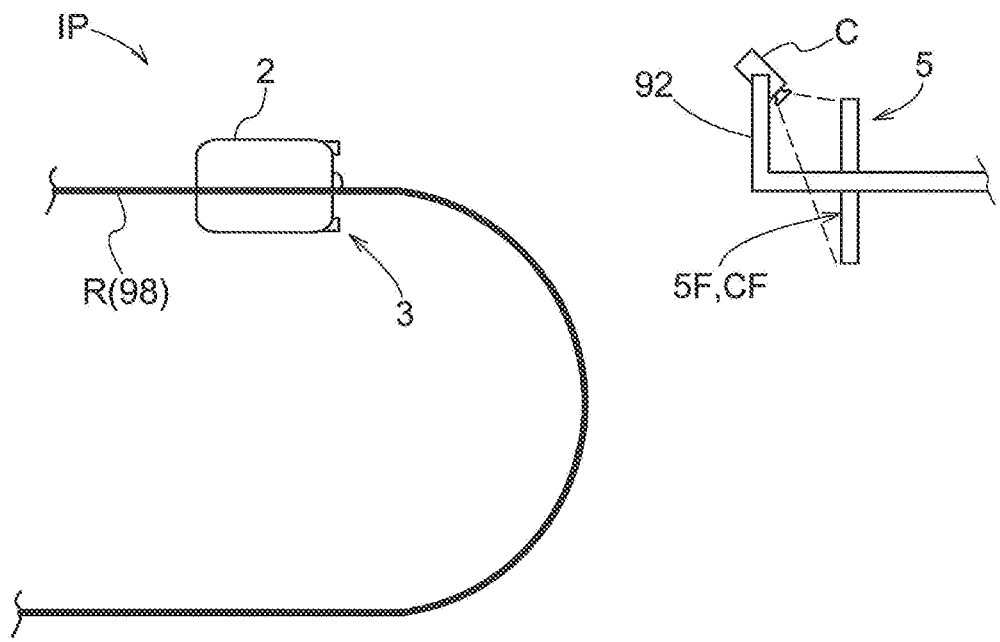
FIG. 8 is a diagram showing an arrangement configuration of an inspection system according to another embodiment.

(1) The above embodiment has described an example in which the image capturing device C is disposed on a side opposite to the inspection location IP across the projection surface 5F. However, the present disclosure is not limited to such an example, and the image capturing device C may be disposed on the same side as the inspection location IP relative to the projection surface 5F as shown in FIG. 8, for example. In this case, the surface of the projection portion 5 that faces the inspection location IP serves as both the projection surface 5F and the capturing surface CF. Furthermore, in this case, the image capturing device C is disposed at a position that does not block a light projection path between the detector 3 and the projection surface 5F. Accordingly, the image capturing device C is disposed so as to capture an image of the projection surface 5F from a direction that is inclined in at least one of the width direction Y and the vertical direction Z relative to a direction orthogonal to the projection surface 5F.

(2) The above embodiment has described an example in which the transport vehicle 2 includes the first detector 31 and the second detector 32 as the detector 3. However, the present disclosure is not limited to such an example, and the transport vehicle 2 may include at least one detector 3, or at least one type of detector 3. Alternatively, the transport vehicle 2 may include three or more types of detectors 3.

(3) The above embodiment has described, as an example, a configuration in which the projection surface 5F is disposed at a position that does not overlap the travel trajectory of the transport vehicle 2. However, the present disclosure is not limited to such a configuration, and the projection surface 5F may be disposed at a position that overlaps the travel trajectory of the transport vehicle 2. In this case, it is preferable to provide a withdrawal mechanism that moves the projection surface 5F so as to withdraw the projection surface 5F (projection portion 5) from the travel trajectory of the transport vehicle 2 when inspection is not performed. Alternatively, the projection surface 5F (projection portion 5) may be mounted, for example, on a moving device (a forklift, a floor transport vehicle, a lifter or the like) capable of freely moving in the facility, or may be configured to be moved manually.

(4) The above embodiment has described an example in which the first detector 31 is a front vehicle sensor, and the second detector 32 is an obstacle sensor. However, the present disclosure is not limited to such an example, and the first detector 31 may be an obstacle sensor, and the second detector 32 may be a front vehicle sensor, for example. Alternatively, one or both of the first detector 31 and the second detector 32 may be a sensor other than a front vehicle sensor and an obstacle sensor. The detection object of the first detector 31 and the second detector 32 may be set as appropriate according to the characteristics and the like of the facility.

(5) The above embodiment has described, as an example, a configuration in which the detector 3 has a detection range IE located on the front side in the advancing direction (front-rear direction X) of the transport vehicle 2. However, the present disclosure is not limited thereto, and it is possible to adopt a configuration in which the transport vehicle 2 includes a detector 3 with a detection range IE located on the rear side in the advancing direction (the front-rear direction X), a detector 3 with a detection range IE located on one or both sides in the width direction Y, a detector 3 with a detection range IE located on the upper or lower side in the vertical direction Z, or the like. In these cases as well, the projection surface 5F is disposed at a position located within the detection range IE of the detector 3 in a state in which the transport vehicle 2 is present at the inspection location IP set on the transport path R. For example, when the detection range IE of the detector 3 is located on the lower side of the transport vehicle 2, the projection surface 5F may be disposed at a position located on the lower side of the transport vehicle 2 present at the inspection location IP.

(6) The above embodiment has described an example in which the transport vehicle 2 is configured as a ceiling guided vehicle. However, the present disclosure is not limited to such an example, and the transport vehicle 2 may be an unmanned transport vehicle that travels on the floor surface, for example. In that case, the transport path R may be set along a travel rail on the floor surface, or may simply be set on the floor surface, for example, using magnetism or the like, without using a travel rail.

(7) Note that the configurations disclosed in the embodiments described above are applicable in combination with configurations disclosed in other embodiments, as long as no inconsistency arises. With regard to the other configurations as well, the embodiments disclosed herein are illustrative in all respects. Therefore, various modifications and alterations may be made as appropriate without departing from the gist of the present disclosure.

3. Outline of the Embodiment

The following is a description of the inspection system described above.

An inspection system for inspecting a detector provided on a transport vehicle that travels on a preset transport path, the inspection system including: a projection surface that is disposed at a position located within a detection range of the detector in a state in which the transport vehicle is present at an inspection location set on the transport path, and onto which detection light projected by the detector is projected; an image capturing device that captures an image of the projection surface; and a determination unit that determines at least one state selected from a position, a shape, and a light intensity of the detection light projected onto the projection surface, based on an image captured by the image capturing device.

With this configuration, the projection surface onto which the detection light projected by the detector provided on the transport vehicle is disposed at a position located within the detection range of the detector in a state in which the transport vehicle is present at an inspection location set on the transport path, and an image capturing device that captures an image of the projection surface is provided. Therefore, it is possible to inspect the detector in a state in which the transport vehicle is present on the transport path. This makes it possible to inspect the detector in a state in which the transport vehicle is present on the transport path. Accordingly, it is possible to reduce the burden of inspecting the detector provided on the transport vehicle that travels along the transport path. With this configuration, it is possible, for example, to determine whether or not the detector is installed in a correct orientation based on the position or the shape of the detection light projected onto the projection surface, or determine whether or not the detector is projecting light normally based on the light intensity, and it is thus possible to appropriately inspect the detector.

Here, it is preferable that the projection surface is configured to allow a portion of light to pass therethrough, and the image capturing device is disposed on a side opposite to the inspection location across the projection surface.

On the same side as the inspection location (the transport vehicle present at the inspection location) as viewed from the projection surface, the transport path is provided, and the travel region of the transport vehicle is present. Accordingly, the aforementioned side is subject to a larger constraint on the location at which the image capturing device can be disposed, as compared with the side opposite to the inspection location as viewed from the projection surface. With this configuration, the image capturing device is disposed on the side opposite to the inspection location across the projection surface, and therefore, the image capturing device can be disposed in a region with a relatively small arrangement constraint. Accordingly, an image that can be easily used for determination performed by the determination unit can be readily captured by the image capturing device.

It is preferable that the transport vehicle includes, in addition to a first detector serving as the detector, a second detector that inspects a region different from a region detected by the first detector, the projection surface includes a first projection region onto which first detection light serving as the detection light is projected, and a second projection region onto which second detection light projected by the second detector is projected, and the determination unit determines, based on an image captured by the image capturing device, at least one state selected from a position, a shape, and a light intensity of the first detection light projected onto the first projection region, and at least one state selected from a position, a shape, and a light intensity of the second detection light projected onto the second projection region.

With this configuration, the first detector and the second detector that inspect inspection regions that are different from each other can be inspected at one time.

It is preferable that the projection surface is disposed at a position that does not overlap a travel trajectory of the transport vehicle.

With this configuration, the inspection system is disposed at a position that does not overlap the travel trajectory of the transport vehicle. Therefore, even if the inspection system is installed in a fixed manner, the transport vehicle that travels on the transport path will not come into contact with the inspection system. Accordingly, it is possible to further reduce the burden of inspecting the detector provided on the transport vehicle that travels on the transport path.

A technique according to the present disclosure can be used for inspection systems for inspecting a detector provided on a transport vehicle.

DESCRIPTION OF REFERENCE SIGNS

1: inspection system
2: transport vehicle
3: detector
5F: projection surface
5Fa: first projection region
5Fb: second projection region
31: first detector
32: second detector
C: image capturing device
IE: detection range
IL: detection light
IL1: first detection light
IL2: second detection light
IP: inspection location
J: determination unit
M: storage device
R: transport path

What is claimed is:

1. An inspection system for inspecting a detector provided on a transport vehicle that travels on a preset transport path, the inspection system comprising:
a projection surface that is disposed at a position located within a detection range of the detector in a state in which the transport vehicle is present at an inspection location set on the transport path, and onto which detection light projected by the detector is projected;
an imager that captures an image of the projection surface; and
a determinator that determines:
at least one state selected from a position, a shape, and a light intensity of the detection light projected onto the projection surface, based on an image captured by the imager; and
whether or not the detector is installed in a correct orientation based on the position or the shape of the detection light projected onto the projection surface, or whether or not the detector is projecting light normally based on the light intensity.

2. The inspection system according to claim 1, wherein the projection surface is configured to allow a portion of light to pass therethrough, and
wherein the imager is disposed on a side opposite to the inspection location across the projection surface.

3. The inspection system according to claim 1, wherein the transport vehicle includes, in addition to a first detector serving as the detector, a second detector that inspects a region different from a region detected by the first detector,
wherein the projection surface includes a first projection region onto which first detection light serving as the detection light is projected, and a second projection region onto which second detection light projected by the second detector is projected, and
wherein the determinator determines, based on an image captured by the imager, at least one state selected from a position, a shape, and a light intensity of the first detection light projected onto the first projection region, and at least one state selected from a position, a shape, and a light intensity of the second detection light projected onto the second projection region.

4. The inspection system according to claim 1, wherein the projection surface is disposed at a position that does not overlap a travel trajectory of the transport vehicle.

5. The inspection system according to claim 1,
wherein the transport path includes a straight segment in a straight-line shape and a curve segment in a curved shape, and
the projection surface is present on an extension of the straight segment and outward of the curve segment.

6. The inspection system according to claim 1, further comprising:
a projection portion,
wherein the projection surface is a part of the projection portion, and
the projection portion is supported by a supporting member present at a position that does not overlap the travel trajectory of the transport vehicle.

7. The inspection system according to claim 6,
wherein the imager is supported by the supporting member, by which the projection portion is also supported.

* * * * *